(12) United States Patent
Dieckmann et al.

(10) Patent No.: US 11,595,228 B2
(45) Date of Patent: Feb. 28, 2023

(54) DATA SYSTEM, DATA TRANSMISSION SYSTEM AND METHOD FOR DATA TRANSMISSION FOR A TOWING VEHICLE AND/OR TRAILER VEHICLE

(71) Applicant: WABCO GmbH, Hannover (DE)

(72) Inventors: Thomas Dieckmann, Pattensen (DE);
Andreas Goers, Pattensen (DE);
Sebastian Kuehne, Sarstedt (DE);
Ralph-Carsten Luelfing, Garbsen (DE); Marco Michel, Hannover (DE);
Thomas Wolf, Barsinghausen (DE);
Oliver Wulf, Neustadt (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 371 days.

(21) Appl. No.: 16/648,670

(22) PCT Filed: Aug. 15, 2018

(86) PCT No.: PCT/EP2018/072100
§ 371 (c)(1),
(2) Date: Mar. 19, 2020

(87) PCT Pub. No.: WO2019/057403
PCT Pub. Date: Mar. 28, 2019

(65) Prior Publication Data
US 2020/0244478 A1    Jul. 30, 2020

(30) Foreign Application Priority Data

Sep. 20, 2017 (DE) ..................... 10 2017 008 870.5
Nov. 9, 2017 (DE) ..................... 10 2017 010 356.9

(51) Int. Cl.
*H04L 12/40* (2006.01)
*G06F 13/40* (2006.01)
*B60D 1/36* (2006.01)

(52) U.S. Cl.
CPC ............... *H04L 12/40* (2013.01); *B60D 1/36* (2013.01); *G06F 13/4022* (2013.01); *H04L 2012/40215* (2013.01); *H04L 2012/40273* (2013.01)

(58) Field of Classification Search
CPC .......... H04L 12/40; H04L 2012/40215; H04L 2012/40273; H04L 12/40189; H04L 12/66; H04L 12/4013; B60D 1/36; G06F 13/4022
See application file for complete search history.

(56) References Cited

U.S. PATENT DOCUMENTS 9,850,839 B2   12/2017  Bridgewater
2009/0254794 A1*  10/2009  Malik .................... H04L 5/006
                                                       714/776

(Continued)

FOREIGN PATENT DOCUMENTS

| DE | 102004035255 B3 | 2/2006 |
|---|---|---|
| DE | 102006023137 A1 | 11/2007 |
| DE | 102011006827 A1 | 10/2012 |
| DE | 102017101467 A1 | 8/2017 |
| WO | 2015074938 A1 | 5/2015 |

*Primary Examiner* — Gregory B Sefcheck
*Assistant Examiner* — Joshua Smith
(74) *Attorney, Agent, or Firm* — Leydig, Voit & Mayer, Ltd.

(57) ABSTRACT

A data system of a towing vehicle and/or trailer vehicle includes a control device, a sensor system configured to record and process sensor data, and a BUS system configured to transfer the sensor data between the control device and the sensor system. The BUS system has a first BUS device in the form of a CAN BUS and a second BUS device in the form of an ETHERNET BUS, and the BUS system further has a first interface configured to transfer the sensor (Continued)

data to a second interface of a second BUS system of a second data system of a second towing vehicle and/or trailer vehicle. The data system additionally includes an intelligent switch, coupled to the control device and/or to the first interface, the intelligent switch being configured to couple the first towing vehicle and/or trailer vehicle to the second towing vehicle and/or trailer vehicle in a coordinated manner.

21 Claims, 6 Drawing Sheets

(56) References Cited

U.S. PATENT DOCUMENTS

| | | | |
|---|---|---|---|
| 2010/0211582 A1 | 8/2010 | Kotski | |
| 2012/0175851 A1* | 7/2012 | Ferrell | B60G 17/018 |
| | | | 700/79 |
| 2012/0283925 A1* | 11/2012 | Barlsen | B60T 17/22 |
| | | | 701/70 |
| 2013/0033381 A1* | 2/2013 | Breed | G08B 13/2417 |
| | | | 340/568.1 |
| 2015/0349977 A1* | 12/2015 | Risse | H04L 12/6418 |
| | | | 375/257 |
| 2016/0052453 A1* | 2/2016 | Nalepka | B60R 1/00 |
| | | | 348/148 |
| 2016/0227755 A1* | 8/2016 | Preheim | B05B 12/08 |
| 2017/0106815 A1* | 4/2017 | Csabai | B60D 1/62 |

\* cited by examiner

DATA SYSTEM, DATA TRANSMISSION SYSTEM AND METHOD FOR DATA TRANSMISSION FOR A TOWING VEHICLE AND/OR TRAILER VEHICLE

CROSS REFERENCE TO RELATED APPLICATIONS

This application is a U.S. National Phase Application under 35 U.S.C. § 371 of International Application No. PCT/EP2018/072100, filed on Aug. 15, 2018, and claims benefit to German Patent Application No. DE 10 2017 008 870.5, filed on Sep. 20, 2017, and No. DE 10 2017 010 356.9, filed on Nov. 9, 2017. The International Application was published in German on Mar. 28, 2019 as WO 2019/057403 under PCT Article 21(2).

FIELD

The invention relates to a data system and a data transmission system, each having a data system for each of a towing vehicle and/or a trailer vehicle, in particular for commercial vehicles such as a heavy goods vehicle or heavy goods vehicle trailer or a passenger bus or passenger bus trailer. The invention further relates to a towing vehicle and/or trailer vehicle and to a corresponding method for data transmission for a towing vehicle and/or trailer vehicle.

BACKGROUND

Such a data system for a towing vehicle and/or a trailer vehicle typically includes a control device, a sensor system for recording and processing sensor data, a BUS system for transmitting the sensor data between the control device and the sensor system, an interface of the BUS system for transmitting the sensor data to an interface of a BUS system of a respective other data system of the towing vehicle and/or trailer vehicle within the framework of a data transmission system, wherein the BUS system has a first BUS device in the form of a CAN BUS.

In the framework of the data transmission system it is usually provided that the data transmission system has one such data system for a towing vehicle and/or a trailer vehicle, wherein the data system of the towing vehicle and/or trailer vehicle in each case has: a control device, a sensor system for recording and processing sensor data, a BUS system for transferring the sensor data between the control device and the sensor system, an interface of the BUS system for transferring the sensor data to an interface of a BUS system of the respective other data system of the towing vehicle and/or trailer vehicle within the framework of the data transmission system, and the data transmission system has: a data connection between the interface of the towing vehicle and that of the interface of the trailer vehicle, wherein the BUS system has the first BUS device in the form of a CAN BUS in each case.

A first data system of the above-mentioned type is therefore provided, which has: a first control device, a first sensor system for recording and processing sensor data, a first BUS system for transmitting the sensor data between the control device and the sensor system, a first interface of the BUS system for transmitting the sensor data to a second interface of a second BUS system of a respective other second data system of the towing vehicle and/or trailer vehicle within the framework of a data transmission system, wherein the first BUS system has a first BUS device in the form of a CAN BUS.

A second data system of the above-mentioned type is also provided, which has: a second control device, a second sensor system for recording and processing sensor data, a second BUS system for transmitting the sensor data between the control device and the sensor system, a second interface of the BUS system for transmitting the sensor data to the above-mentioned first interface of the first BUS system of a respective other first data system of the towing vehicle and/or trailer vehicle within the framework of a data transmission system, wherein the second BUS system has a further first BUS device in the form of a CAN BUS.

Technically speaking, a CAN BUS (Controller Area Network) bus, is an asynchronous, temporally staggered serial BUS system, which was developed in the 1980s for the networking of control devices in the automotive sector. The purpose of this CAN BUS system is to reduce wiring harnesses and thereby to save weight. Instead of using an electrical circuit for each transmitted signal, the BUS device in the form of a CAN BUS is based on a communication platform which is responsible for the transmission of messages between individual devices. The conversion of all control signals into messages requires an enhanced intelligence in the connected devices. In return, however, many devices can exchange information quasi-simultaneously over a small number of cable connections. In the meantime, in the case of larger systems it is certainly possible to exchange more complex information relating, for example, to wheel wear, speeds or other complex vehicle data.

In the data-communication coupling of towing vehicle and trailer vehicle, especially in the commercial vehicle sector, such as the data-communication coupling of a heavy goods vehicle with a trailer, the standardized ISO-CAN BUS has become established; this is described and defined in detail in a wide range of ISO standards. In particular, the ISO 11992 standard with pending extensions defines CAN-based vehicle BUS standards for commercial vehicle applications of a towing vehicle with one or more trailers (Title: Road vehicles and interchange of digital information on electrical connections between towing and towed vehicles). The protocol structure is similar to the SAE J1939 standard, but differs partly in terms of clock rate, timing sequences and voltage levels of the structure, and/or the message identifications.

Such CAN BUS-based data systems and data transmission systems between a towing vehicle and trailer vehicle have now established themselves and been a proven technology in the automotive sector for decades, even with the increasing number and complexity of the connected devices in the vehicle or the increasing complexity of the control devices, whether they be centralized or decentralized control device systems.

However, the volume of data traffic that is now generated on the vehicle has in many aspects grown to new proportions with correspondingly higher qualitative requirements; it is desirable to transmit data volumes of at least up to 100 Mbit/s or more with correspondingly high speeds. Here, the principles of a CAN BUS-based data system that have been available up to now are proving inadequate. In particular, the transmission between the first data system of a trailer and the second data system of a towing vehicle in many ways turns out to be a bottleneck for handling incoming data on the trailer and/or the towing vehicle using data processing technology.

This relates in particular to the driver assistance systems (Advanced Driver Assistance Systems, ADAS) or systems relating to automated driving (AD) that have recently gained increased importance. On the one hand, such systems no longer rely solely on sensor data from a single vehicle, therefore requiring rapid processing and transmission of recorded sensor data in a sensor system, but also the actual transmission with corresponding transmission rates between a first and a second sensor or data system in an appropriate data transmission system for the towing vehicle and trailer vehicle.

Previously developed alternatives to CAN BUS-based data systems, such as a power-based communication (Powerline Communication, PLC) according to SAE J24997 or the like, or an extension of the CAN BUS systems, for example according to ISO 11992 or the like, have the above-mentioned limitations in terms of data rate and real-time transmission of data—such as camera data, Lidar or radar data—or auxiliary solutions, which are provided, for example, by additional wiring, connectors or similar coupling technologies are only reluctantly accepted by customers because they have increased the complexity of the systems and the effort required to maintain them.

Alternatives are offered by data transmission systems with higher transmission rates, such as broadcasting solutions which can be, for example, radio-based, or peer-to-peer-based solutions such as Car-to-Car or Car-to-X communications are dependent on other prerequisites that are not widely available or are affected by limited reliability and transmission reliability. Thus it often involves considerable effort to "pair" such systems (pairing) and moreover, the "pairing" connections are insecure in terms of data transmission and also easy to disrupt or manipulate. All this argues against the use of such alternatives in broadband, high-speed real-time data transmission between a towing vehicle and a trailer vehicle.

SUMMARY

In an embodiment, the present invention provides a data system of a towing vehicle and/or trailer vehicle. The data system includes a control device, a sensor system configured to record and process sensor data, and a BUS system configured to transfer the sensor data between the control device and the sensor system. The BUS system has a first BUS device in the form of a CAN BUS and a second BUS device in the form of an ETHERNET BUS, and the BUS system further has a first interface configured to transfer the sensor data to a second interface of a second BUS system of a second data system of a second towing vehicle and/or trailer vehicle. The data system additionally includes an intelligent switch, coupled to the control device and/or to the first interface, the intelligent switch being configured to couple the first towing vehicle and/or trailer vehicle to the second towing vehicle and/or trailer vehicle in a coordinated, demand-based manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
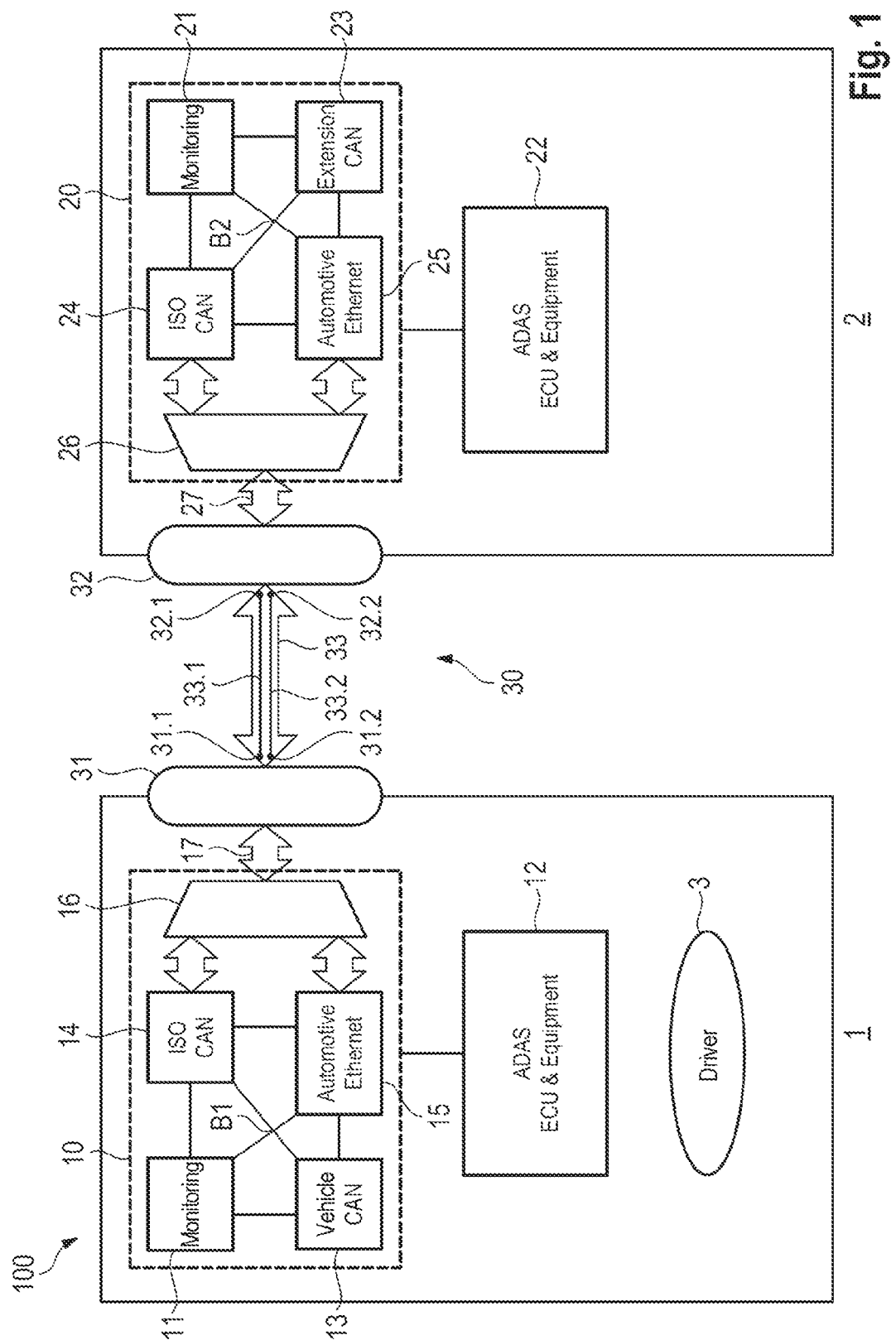
FIG. 1 provides a schematic view of a towing vehicle and trailer vehicle with a preferred embodiment of a data transmission system for the towing vehicle and trailer vehicle.

It is desirable to provide a data system and a data transmission system, each having a data system for both a towing vehicle and/or a trailer vehicle, which are based on the previously established structures of a BUS device in the form of a CAN BUS, but which can be configured for a data system with higher data transmission and/or real-time capability, in particular with a reliable security standard. In particular, a data transmission system should provide an improved solution to one or more of the problems of prior art solutions.

Embodiments of the present disclosure specify data systems and data transmission systems together with towing vehicles and/or trailer vehicles each having such a data system. Embodiments of the present disclosure further specify a method for data transmission for a towing vehicle and/or trailer vehicle, which is based on a control device, a sensor system, and a BUS system in the form of a CAN BUS and an interface of the BUS system suitable for the transmission of sensor data. A data system and a data transmission system or a corresponding data transmission have improved transmission capacity in terms of volume and/or speed.

Embodiments of the present disclosure relate to a data system of a towing vehicle and/or trailer vehicle, in particular for commercial vehicles such as a heavy goods vehicle or heavy goods vehicle trailer or a passenger bus or passenger bus trailer.

Embodiments of the present disclosure further relate to a data transmission system of a towing vehicle and trailer vehicle, in particular for commercial vehicles such as a heavy goods vehicle or heavy goods vehicle trailer or a passenger bus or passenger bus trailer.

Embodiments of the present disclosure further relate to a method for data transmission with a data system for each of a towing vehicle and/or a trailer vehicle, in particular for commercial vehicles such as a heavy goods vehicle and trailer or a passenger bus and trailer, wherein in the framework of a data transmission system the data system of the towing vehicle and/or trailer vehicle is based on a control device, a sensor system, and a BUS system in the form of a CAN BUS and an interface of the BUS system suitable for the transmission of sensor data.

Embodiments of the present disclosure are based on a data transmission system of the type mentioned at the outset. In accordance with embodiments of the present disclosure, the BUS system of the data transmission system has a second BUS device in the form of an ETHERNET BUS, and the data system of the towing vehicle and/or trailer vehicle in each case also has an intelligent switch, coupled to the control device and/or to the interface, which is designed to couple the towing vehicle and the trailer vehicle in a coordinated, demand-based manner by means of the ETHERNET BUS by activating the second BUS device in the form of an ETHERNET BUS.

In particular, in a data transmission system with a data system for each of a towing vehicle and/or trailer vehicle, a data connection is provided between the interface of the towing vehicle and that of the interface of the trailer vehicle, wherein according to embodiments of the disclosure the data connection between the interfaces of the towing vehicle and trailer vehicle is implemented as a twisted-pair cable connection.

According to embodiments of the disclosure, a method provides the steps of connecting the respective second BUS device in the form of the ETHERNET BUS and testing a possible data transmission via the ETHERNET BUS, switching the switch over to transmitting sensor data over the ETHERNET BUS if the test for a possible data transmission over the ETHERNET BUS for the towing vehicle and/or trailer vehicle is positive, transmitting sensor data from the respective second BUS device between the interfaces of the trailer vehicle and towing vehicle via the twisted-pair cable connection.

A positive test result is understood to mean firstly that the data transmission is possible with the BUS system concerned, that is to say, a corresponding enabling of the BUS system is possible. Independently of this, the test can be carried out to determine whether a data transmission is possible via the corresponding BUS device in a timely manner or with the desired data rate; this therefore comprises the test for a temporal availability.

Embodiments of the present disclosure recognize that in the field of data transmission there are now BUS systems available which are capable of transmitting significantly higher transmission rates and data volumes. These are suitable not only for transmitting complex technical sensor data of a plurality of vehicle devices relating to the vehicle, but more importantly are able to handle data volumes and data rates of multi-media sensor data of a plurality of recording devices that sense the vehicle environment.

This relates not only to multimedia sensor data from cameras, microphones and voice recordings but also data from LIDAR, RADAR and GPS data, as well as complex streaming-based multimedia data applications.

Such a high-speed automotive-enabled data BUS system is the (automotive) ETHERNET BUS system, which is proposed by the invention as a second BUS device for the data system of the towing vehicle and/or trailer vehicle.

In addition, and on the basis of this idea, embodiments of the present disclosure have recognized, however, that it requires an intelligent switch which is connected to the control device and/or the interface of the corresponding data system of the towing vehicle and/or trailer vehicle. This switch is designed to consider the security of the data connection as well as the reliability of the data connection with regard to data transmission rate and volume of data. Embodiments of the present disclosure have recognized that, in accordance with the present disclosure, such a switch is designed to couple the towing vehicle and the trailer vehicle in a coordinated, demand-based manner by means of the ETHERNET BUS by activating the second BUS device in the form of an ETHERNET BUS.

In the context of a particularly preferred refinement, the present disclosure has recognized that the switch is intelligent insofar as this is capable of implementing the standards of ISO 11992 accepted on CAN BUS systems (comprising at least the parts of the standard 2, 3 and 4) and to transform them to the high-speed protocol of the ETHERNET BUS.

This means that the packet requirements of the ISO11992 standard in terms of transmission rates, clock rates and volumes of data are also taken into account in a demand-based, coordinated coupling of the towing vehicle and the trailer vehicle using the ETHERNET BUS, wherein the second BUS device in the form of an ETHERNET BUS is enabled. In particular, packet requirements of the ISO11992 standard in terms of transmission rate, clock rate and data volume-are implemented in the context of the data transmission system for a data connection between the interface of the towing vehicle and that of the interface of the trailer vehicle, wherein the data connection between the interfaces of the towing vehicle and trailer vehicle is implemented as a twisted-pair cable connection.

This consideration ensures that both coupled subscribers of the data transmission system, namely the data system of the towing vehicle and/or the data system of the trailer vehicle, while they are indeed able to communicate via data transfer technology over the high-speed link, still conform to ISO 11992 (at least Part 1 of the standard) at the same time. The overall solution of a BUS system with a first BUS device in the form of a CAN BUS and a second BUS device in the form of an ETHERNET BUS, and of the said intelligent switch, on the one hand, is able to supplement established CAN BUS-based systems and at the same time to use or expand them as a fallback position for a faster and more comprehensive data-based communication. All this is made possible by the data transmission system while maintaining the ISO 11992 standard for data communication between the above-mentioned first and second data system for a towing vehicle and/or a trailer vehicle.

In the context of a first and/or second data system of a towing vehicle and/or trailer vehicle, in particular for commercial vehicles such as a heavy goods vehicle or heavy goods vehicle trailer or a passenger bus or passenger bus trailer, it is preferably provided to enable the first BUS device in the form of the CAN BUS for connecting in each case the first BUS device in the form of the CAN BUS of the data system of the towing vehicle and/or trailer vehicle to each other, wherein the switch, and the switch is designed, either to enable the second BUS device in the form of the ETHERNET BUS for connecting in each case the second BUS device in the form of the ETHERNET BUS of the data system of the towing vehicle and/or trailer vehicle to each other.

In the context of a first and/or second data system it is preferably provided that the interface is designed either to couple the first BUS device of the towing vehicle and the trailer vehicle by means of the CAN BUS, or to couple the towing vehicle and the trailer vehicle by means of the ETHERNET BUS.

In the context of a first and/or second data system it is preferably provided that the BUS system has: a vehicle BUS (in particular a towing vehicle BUS of the towing vehicle and/or an expansion BUS of the trailer vehicle, an ISO-CAN BUS, in particular a towing vehicle ISO-CAN BUS of the towing vehicle and/or an expansion ISO-CAN BUS of the trailer vehicle, an automotive ETHERNET BUS, in particular an automotive towing vehicle ETHERNET BUS of the towing vehicle and/or an expansion ETHERNET BUS of the trailer vehicle. It should be noted that the towing vehicle ISO-CAN BUS should be understood in the proper sense as a towing vehicle side of the ISO-CAN BUS, since the ISO-CAN BUS is a pure point-to-point connection. The same also applies on the trailer side to the trailer vehicle ISO-CAN BUS, which should be understood in the proper sense as a trailer vehicle side of the ISO-CAN BUS, since the ISO-CAN BUS is a pure point-to-point connection.

The ETHERNET BUS should also be understood as a point-to-point connection in an analogous manner.

In the context of a first and/or second data system it is preferably provided that the BUS system has: in addition to the ISO-CAN BUS, a non-ISO-CAN BUS, in particular a towing vehicle non-ISO-CAN BUS of the towing vehicle and/or an expansion non-ISO-CAN BUS of the trailer vehicle, and/or in addition to the automotive ETHERNET BUS, a power over data lines (PoDL) communication connection, in particular an automotive towing vehicle PoDL communication connection of the towing vehicle and/or an expansion PoDL communication connection of the trailer vehicle.

In the context of a first and/or second data system it is preferably provided that the sensor data comprise: multimedia sensor data of a plurality of recording devices that sense the vehicle environment, and/or complex sensor data of a plurality of vehicle devices relating to the vehicle.

In the context of a first and/or second data system it is preferably provided that the BUS system is integrated in the vehicle in each case as a complete system, in particular as a single BUS system.

In the context of a first and/or second data system it is preferably provided that the BUS system is fitted in the vehicle in each case as a retrofit system, in particular in addition to a further, already existing CAN BUS system.

In the context of a first and/or second data system it is preferably provided that the switch, as an interface switch, forms the interface, in particular as a parallel switch or as a serial switch.

In the context of a first and/or second data system it is preferably provided that the switch—independently of the interface or as an interface switch forming the interface—is connected to an intelligent decision logic and/or a control device of the towing vehicle and/or trailer vehicle.

Preferably, in the context of the data transmission system, in each case with a first and/or second data system, for each towing vehicle and/or trailer vehicle, in particular for commercial vehicles such as a heavy goods vehicle and trailer or a passenger bus and trailer, it is provided that the sensor data can be transmitted to the respective other BUS system of the data system of the towing vehicle and/or trailer vehicle within the framework of the data transmission system, via the second BUS device in the form of the ETHERNET BUS, provided the towing vehicle and trailer vehicle both have an ETHERNET BUS, and/or via the first BUS device in the form of the CAN BUS, provided the towing vehicle and/or the trailer vehicle have an ETHERNET BUS which proves to be inadequate.

In the latter case of the transmission via the first BUS device in the form of the CAN BUS, provided the towing vehicle and/or the trailer vehicle have an ETHERNET BUS which proves to be insufficient, a priority-controlled reduction of the data volume can be allowed for.

In the context of the data transmission system with a first and/or second data system, it is preferably provided that a transmission measurement unit is designed to test the data connection between the interfaces of the towing vehicle and/or trailer vehicle, and to transmit a test result to a decision logic and/or a control device for activating the switch.

For methods according to the present disclosure, the transmission of sensor data from the respective first BUS device between the interfaces of the towing vehicle and trailer vehicle via the twisted-pair cable connection is optionally provided.

Normally the first BUS device is implemented in the form of a CAN BUS as a twisted-pair cable connection—as a double conductor of a cable with at least two twisted pairs of wires—in other words it is implemented, in particular, as a so-called unshielded twisted-pair (UTP) data cable (according to the UTP standard) or shielded twisted-pair (STP) data cable (according to the STP standard); according to standard ISO 11992 or to standard ISO 11898.

Exemplary embodiments of the invention will now be explained below, by reference to the drawing. This is not necessarily intended to represent the exemplary embodiments to scale; instead the drawing is shown in a schematic and/or slightly distorted form, where appropriate to the explanation. In order to supplement the teachings immediately identifiable from the drawing, reference is made to the relevant prior art. It should be borne in mind here that various modifications and changes relating to the shape and detail can be made to an exemplary embodiment without departing from the general idea of the invention. The features of the invention disclosed in the description, the claims and the drawings can be essential to the refinement of the invention both individually and in any desired combination. Moreover, the scope of the invention covers any and all combinations of at least two features disclosed in the description, the claims and/or the drawings. The general idea of the invention is not limited to the exact shape or details of the preferred exemplary embodiments shown and described in the following, nor limited to a subject matter that would be restricted in comparison to the subject matter claimed in the claims. Where dimensional ranges are specified, values within the given boundaries should also be understood to be disclosed as limits and to be applicable and claimable in any desired way. For the sake of simplicity, in the following the same reference symbols are used for identical or similar parts or parts with identical or similar functions.

FIG. 1 shows a schematic representation of a preferred embodiment of a data transmission system for a towing vehicle 1 and a trailer vehicle 2. The data transmission system 100 in accordance with the concept of the present disclosure comprises a data system 10 for the towing vehicle and a data system 20 for the trailer vehicle, which for the sake of simplicity will be referred to in the following as data system 10, 20 in the context of the data transmission system 100, despite being labeled with different reference symbols.

Each data system 10, 20 has a control device 11, 21, a sensor system 12, 22, which is symbolized here as a driver assistance system ADAS—with an associated ECU and corresponding field devices (Equipment)—and examples of which are shown in more detail in the following embodiments of FIG. 2 and FIG. 3. The driver 3 normally sits in the towing vehicle 1, which is only shown here as an exemplary illustration however.

In any case, the essential data and the graphical representations of the same are provided in the vehicle console for the driver 3 in the towing vehicle 1, so that a data transmission of the sensor data—shown here with arrow connections—from the sensor system 12 of the towing vehicle 1 of the trailer vehicle must be available in the driver console of the towing vehicle 1 to be able to implement driver assistance via ADAS.

A first data system 10 of the type mentioned initially is therefore provided, which has: a first control device 11, a first sensor system 12 for recording and processing sensor data, a first BUS system B1 for transferring the sensor data between the control device 11 and the sensor system 12, a first interface 31 of the BUS system for transferring the sensor data to a second interface 32 of a second BUS system 23, 24, 25 of a respective other second data system 20 of the trailer vehicle 2 within the framework of a data transmission system 100, wherein the first BUS system has a first BUS device 13, 14 in the form of a CAN BUS.

A second data system 20 of the type mentioned initially is also provided, which has: a second control device 21, a second sensor system 22 for recording and processing sensor data, a second BUS system B2 for transferring the sensor data between the control device 21 and the sensor system 22, a second interface 32 of the BUS system for transferring the sensor data to the above-mentioned first interface 31 of the first BUS system of a respective other first data system 10 of the towing vehicle 1 within the framework of a data transmission system 100, wherein the second BUS system has a further first BUS device 23, 24 in the form of a CAN BUS.

The BUS system of the towing vehicle V-CAN 13 or of the trailer vehicle EXT-CAN 23 is usually implemented as a CAN BUS and the towing vehicle-based and trailer vehicle-based BUS systems are also embodied here as ISO-CAN BUS 14, 24. This embodiment corresponds to the first BUS devices in the form of a CAN BUS in accordance with the concept of the present disclosure.

The ISO 11992 CAN BUS, however, transmits data that are important for the security of the vehicle as a whole, i.e. the towing vehicle and the trailer vehicle. The V-CAN BUS and the EXT-CAN BUS 13, 23 are standard 5V CAN buses according to ISO11898. By contrast an ISO11992 ISO-CAN BUS 14, 24 is a 12V/24V "bus", which has a different physical interface and can have only one point-to-point connection. Because of the single-wire capability this is particularly fail-safe and therefore particularly suitable for security applications, and acts as a secure fallback level in any case.

The data connection of the BUS devices as the ISO-CAN BUS 14, 24 with its single-wire capability counts as a special feature, since in the context of such a point-to-point connection between the BUS of the first data system 10 and the BUS of the second data system 20 of the towing vehicle 1 or trailer vehicle 2, in the case of an ISO 11992 CAN BUS the communication can be maintained even if one of the two data lines has been interrupted.

The point-to-point connection is established in the context of the preferred embodiment over an interface connection 30 with a first interface 31 and a second interface 32, as well as a physical cable connection—here the data cable 33.

As is known, the data transmission system 100, in accordance with the concept of the present disclosure, in this case has a BUS system for each of the data systems 10, 20—namely in each case a second BUS device in the form of an ETHERNET BUS 15, 25 (Auto-ETHER). The respective data system 10, 20 of the towing vehicle and/or trailer vehicle 1, 2 also has an intelligent switch 16, 26 coupled to the control device 11, 21 and/or the interface 31, 32. Each of these switches 16, 26 is optional for the connection 17, 27 via the interface 31, 32 and the data cable 33 in each case of the first BUS device 14, 24 in the form of the ISO-CAN BUS of the data system 10, 20 of the towing vehicle and/or trailer vehicle 1, 2 to each other, or in each case of the second BUS device 15, 25 in the form of the ETHERNET BUS (Auto-ETHER) of the data system 10, 20 of the towing vehicle and/or trailer vehicle 1, 2 to each other. In this way, the towing vehicle and trailer vehicle 1, 2 can be coupled for data transfer by means of the ETHERNET BUS 15, 25.

In concrete terms it is provided that the BUS system has a second BUS device in the form of an ETHERNET BUS 15, and the data system 10 of the towing vehicle 1 also has an intelligent switch 16, coupled to the control device 11 and/or to the interface 31, which is designed to couple the towing vehicle 1 and the trailer vehicle 2 in a coordinated, demand-based manner by means of the ETHERNET BUS 15 by activating the second BUS device in the form of an ETHERNET BUS 15.

It is also concretely provided that the second BUS system has a further second BUS device in the form of an ETHERNET BUS 25, and the data system 20 of the trailer vehicle 2 also has an intelligent switch 26, coupled to the control device 21 and/or to the interface 32, which is designed to couple the towing vehicle 1 and the trailer vehicle 2 in a coordinated, demand-based manner by means of the ETHERNET BUS 25 by activating the second BUS device in the form of an ETHERNET BUS 25.

Now an automotive ETHERNET connection (Auto-ETHER) 15, 25, as shown here as ETHERNET BUS 15, 25, does not have the above-described property of the single-wire capability of an ISO-CAN BUS (the standard CAN BUS is implemented e.g. as a 5V V-CAN bus in accordance with ISO 11898); here, the connection 17, 27 is implemented via the interfaces 31, 32 and the data cable 33. This is implemented here as a double conductor of a cable with at least two twisted pairs of wires 33.1, 33.2, in particular as a so-called unshielded twisted pair data cable (UTP—i.e. without a shield), but possibly also as a shielded twisted pair data cable (STP—i.e. with a shield).

According to the concept of the present disclosure it is then provided that the interface drivers are switched over from ISO 11992 CAN to Auto-ETHERNET at the interfaces 31, 32 with the intelligent switch 16, 26 via the same physical cable connection or link 31, 32, 17, 27—in other words, the same connector pins 31.1, 31.2 or 32.1, 32.2 are assigned at the interfaces 31 or 32. This is implemented via the intelligent switches 16, 26 as soon as both subscribers—which means the data systems 10, 20 of the towing vehicle 1 and the trailer vehicle 2—have verified with respect to each other that they have an identical fast data connection—namely here an Auto-ETHER BUS connection 15, 25. The data content of different parts of ISO 11992 is designed to be embedded in the communication via Auto-ETHERNET and transmitted with ISO 11992-defined cycle times.

Figure 2:
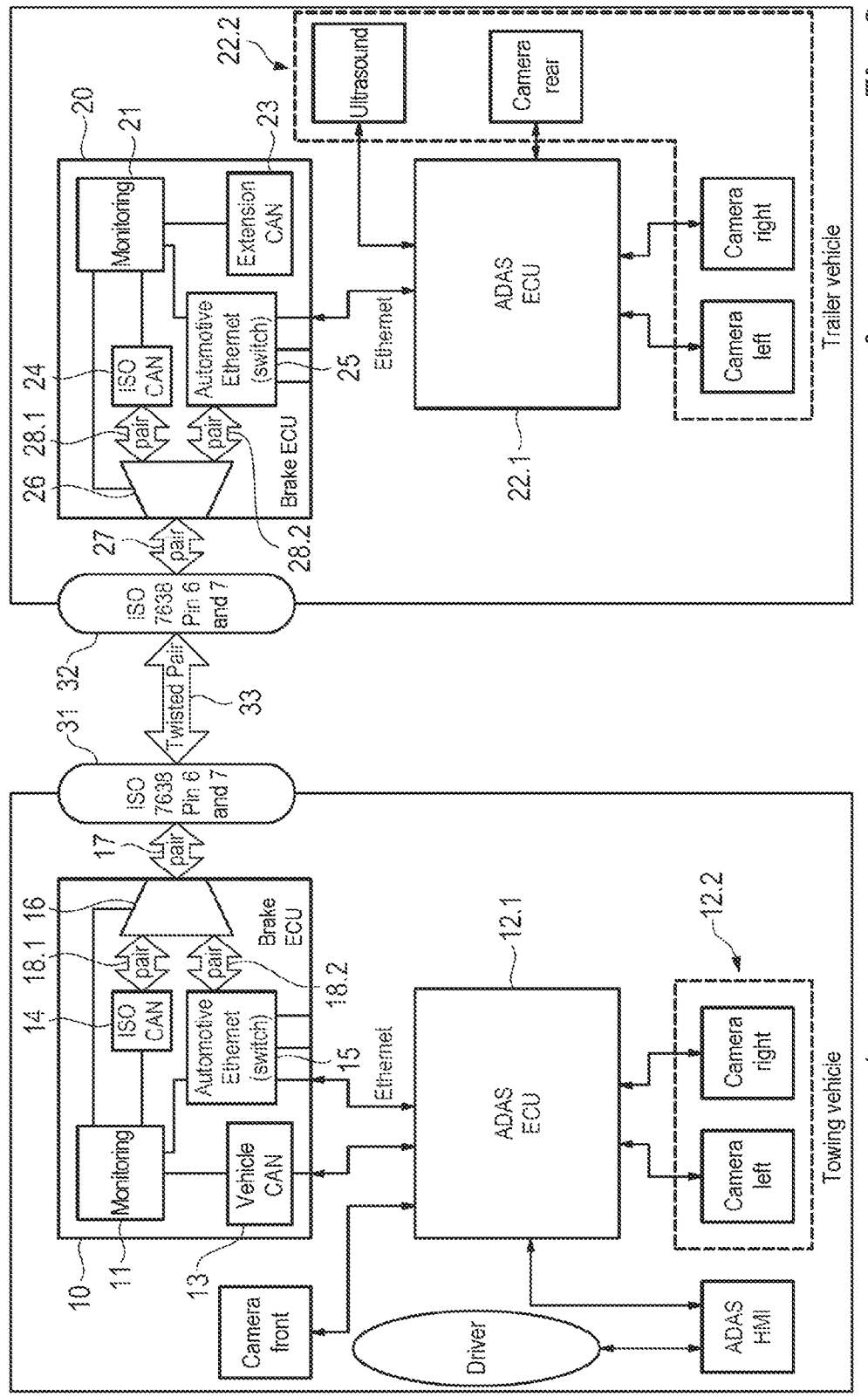
FIG. 2 provides a first variation of the preferred embodiment of a data transmission system already integrated in the towing vehicle and/or trailer vehicle.
Figure 3:
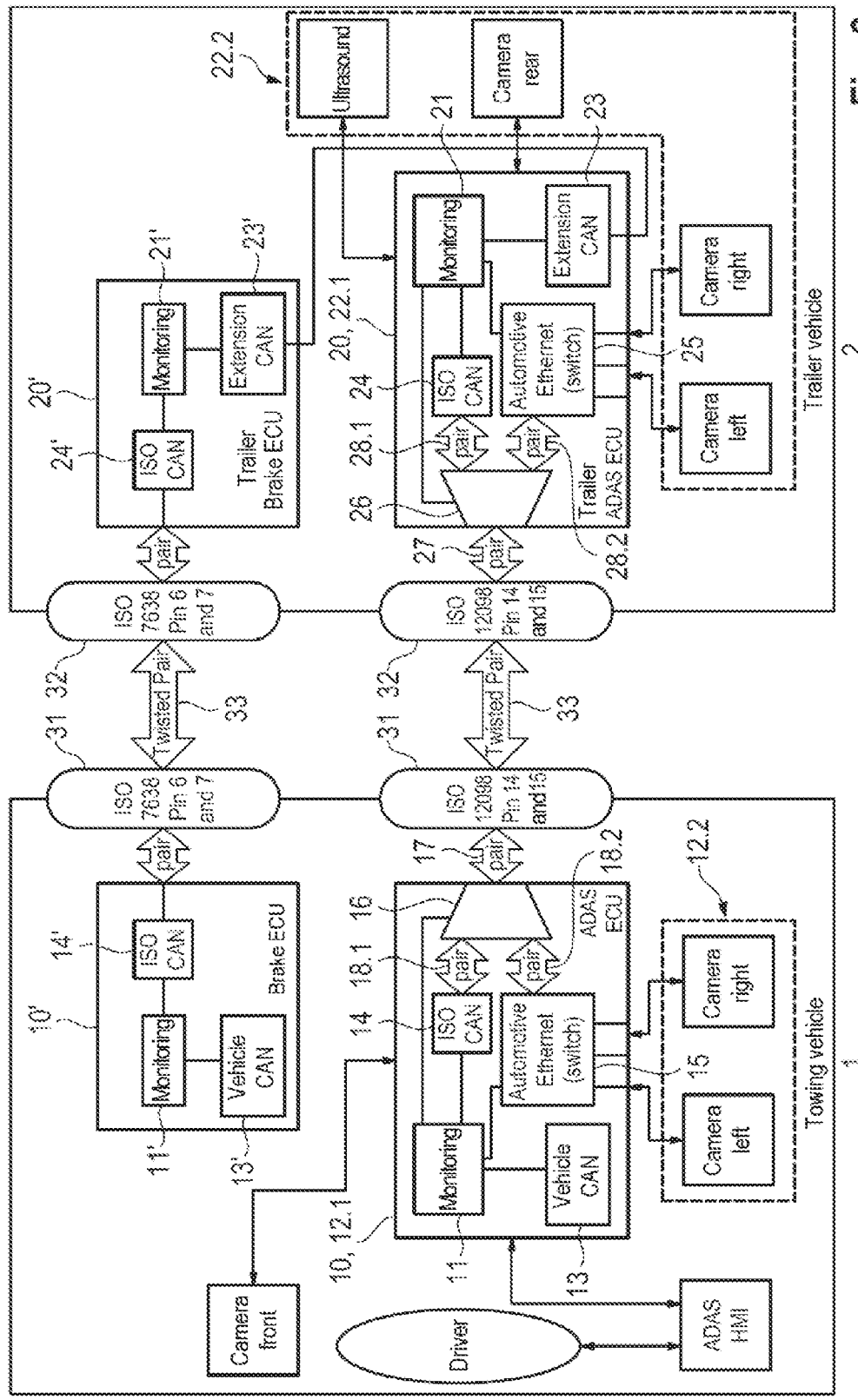
FIG. 3 provides a second variation of the preferred embodiment of a data transmission system retrofitted in the towing vehicle and/or trailer vehicle.

Details of different embodiments of such a data transmission system are shown in the context of a first embodiment in FIG. 2 and in the context of a second embodiment in FIG. 3.

FIG. 2 shows a somewhat detailed schematic drawing of a first variation of the preferred embodiment of FIG. 1, and for this reason for the sake of simplicity the same reference characters are used for equivalent features or features of equivalent function.

On the one hand, FIG. 2 shows with somewhat more complexity the ADAS system 12, 22 with ECU 12.1, 22.1 and equipment 12.2, 22.2 (for example, in the form of a camera or ultrasonic sensors). The ADAS system 12, 22 and here, in particular, the ADAS-ECU 12.1, 22.1 is connected via an ETHERNET BUS 15, 25 to an automotive ETHERNET BUS unit 15, 25, of each data system 10, 20—the data system of the ETHERNET BUS 15, 25 here is established in the framework of a data system 10, 20 within a brake-ECU. The coupling, both of the ISO-CAN 14, 24 and of the automotive ETHERNET BUS 15, 25, to the switch 16, 26 is shown here in each case with a pairing arrow 18.1, 18.2 or 28.1, 28.2. Accordingly the representations 28.1 and 28.2 are intended to relate to the trailer.

In addition, the data connections from the control device 11, 21 to the ISO CAN 14, 24 or the switch 16, 26, respectively are shown. The automotive ETHERNET BUS 15, 25 or the vehicle CAN BUS or the extension CAN BUS 13, 23 is also connected to the control unit 21, 14.

Figure 6:
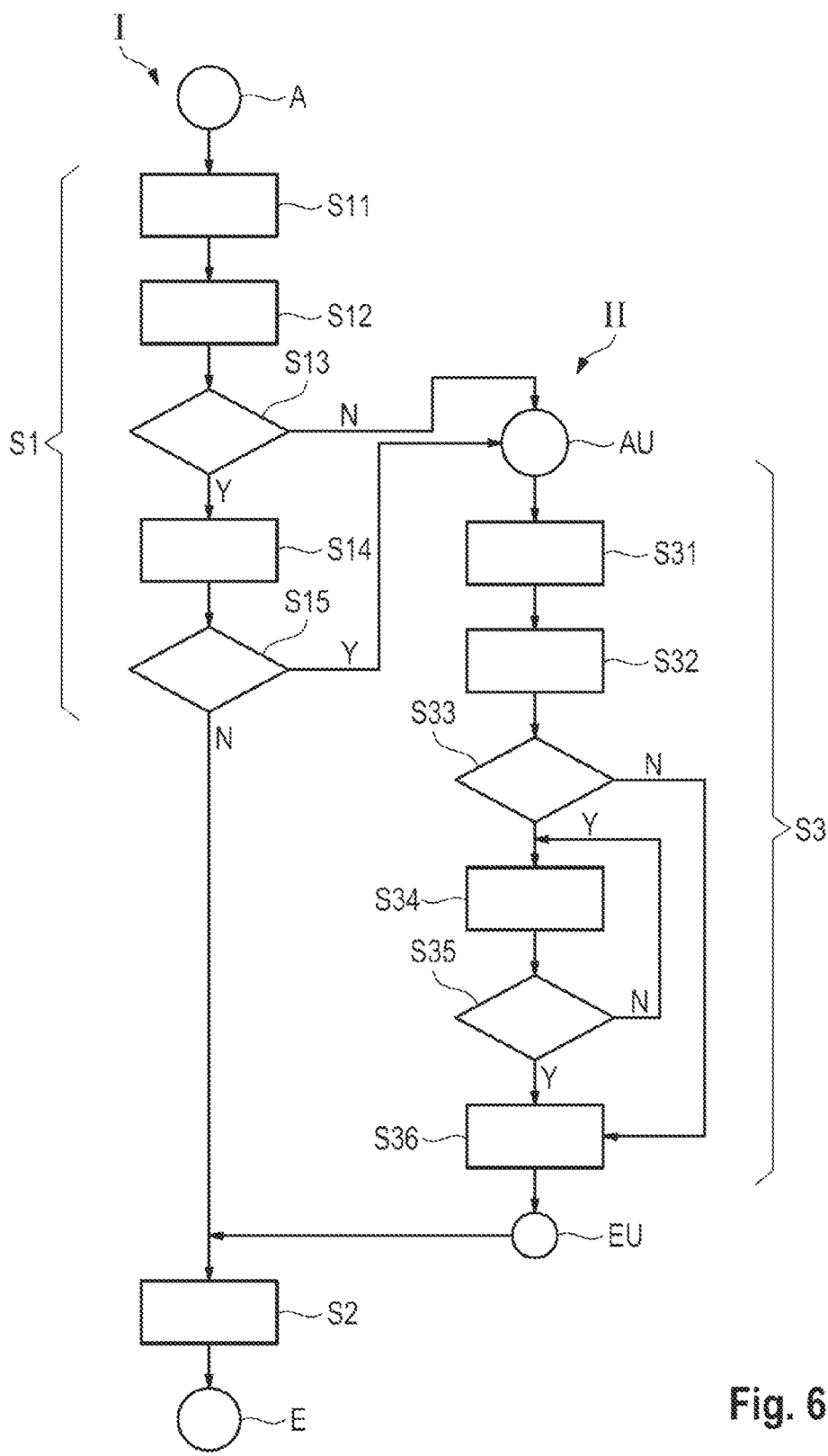
FIG. 6 provides a schematic flow diagram of a preferred embodiment of a method for data transmission for a towing vehicle and trailer vehicle.

Thus if a request is made by the ADAS-ECU 12.1, 22.1 to the data system 10, 20, a high-speed data connection—in the context of the sequence II of the method illustrated in FIG. 6—is negotiated and implemented via the twisted-pair connection and the interfaces 31, 32, 33. The data cable 33—as a double conductor of a cable with at least two twisted pairs of wires 33.1, 33.2—is thus implemented, in particular, as a so-called unshielded twisted pair data cable (UTP).

As shown in FIG. 3 this system can also be implemented virtually identically as part of a retrofit solution in addition to an already existing data communication between 10' and 20' via a CAN BUS—the latter is shown in FIG. 3 at the top; the former retrofit solution (virtually identical to that shown in FIG. 2) in FIG. 3 at the bottom between 10 and 20, again with the same reference symbols.

Figure 4:
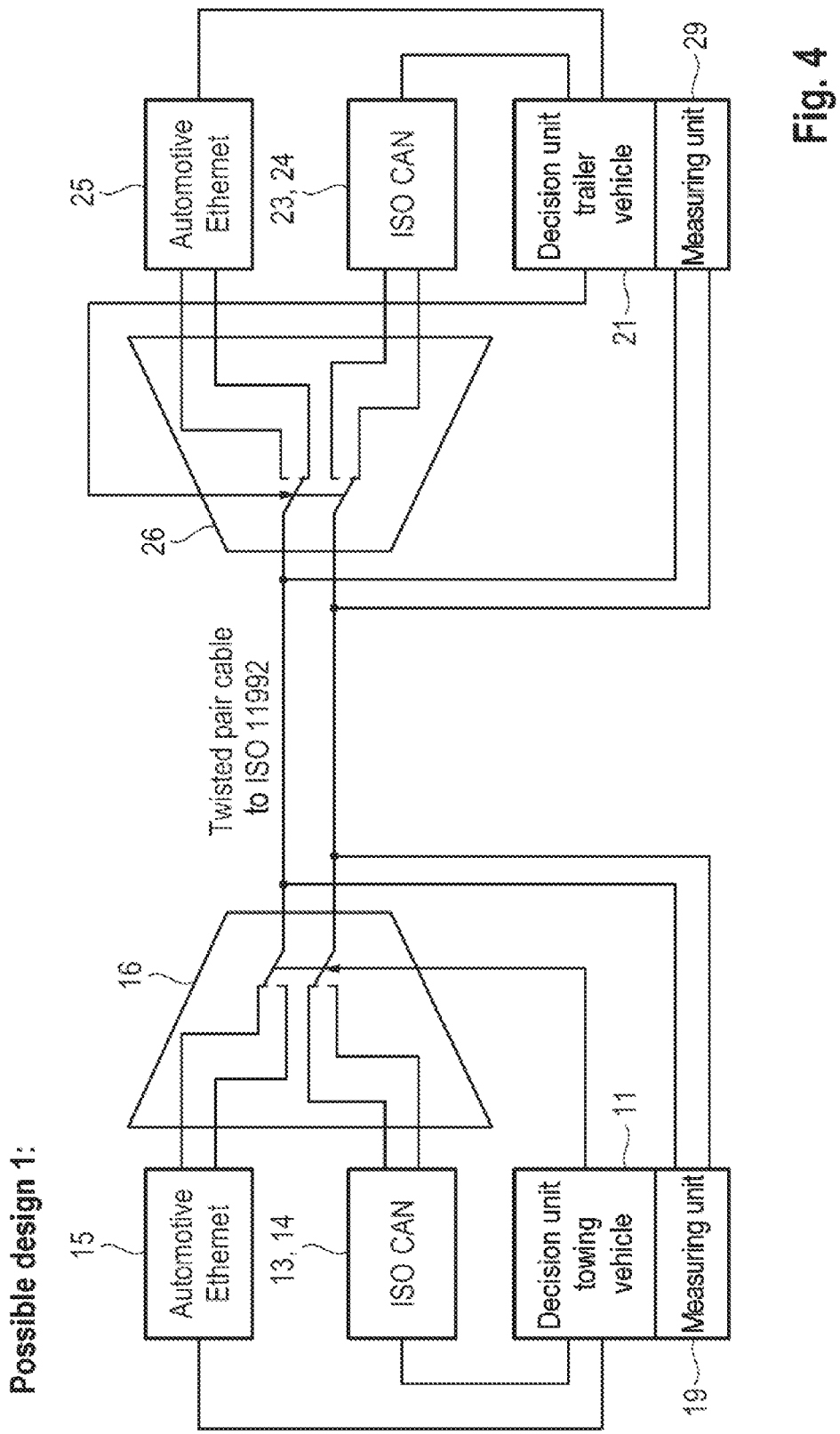
FIG. 4 provides a preferred first embodiment of an intelligent switch as an interface switch, which implements the interface as parallel switches.
Figure 5:
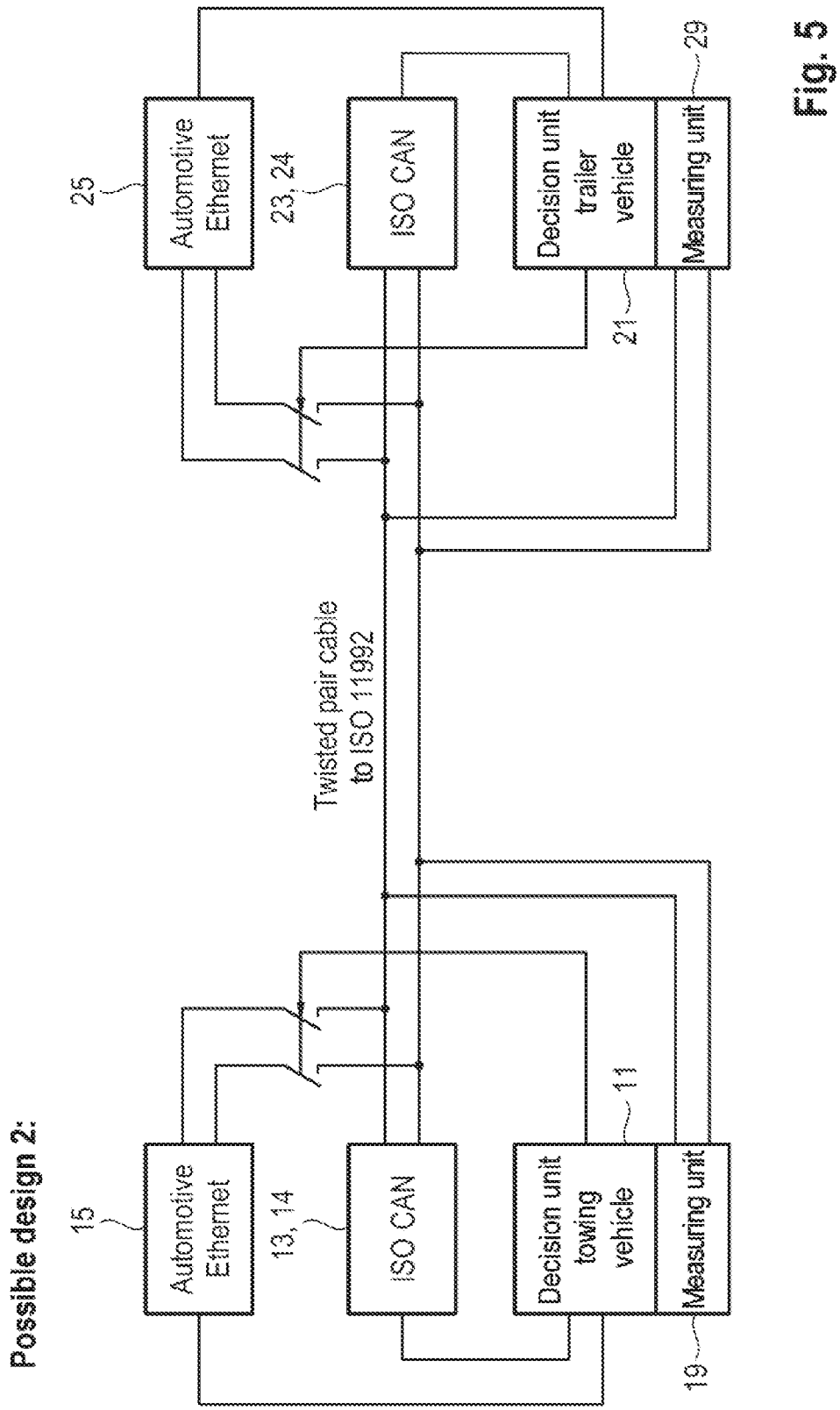
FIG. 5 provides a preferred second embodiment of an intelligent switch as an interface switch, which implements the interface as serial switches.

Different intelligent switch devices are shown as part of a first embodiment of an intelligent switch in FIG. 4 and as part of a second embodiment of an intelligent switch in FIG. 5.

FIG. 4 shows a first switch device with a first intelligent switch 16, 26 and a twisted-pair cable connection according to ISO 11992 in detail. Also for an ISO 7638 connection of the interfaces 16, 26. The data connections shown in FIG. 2 between ISO CAN 14, 24 and automotive ETHERNET 15, 25 are also shown in detail, wherein the connections between the switch 16, 26 and the corresponding control device 11, 21 are also shown.

In addition, a measuring unit 19, 29 is shown, which supports the queries formed in steps S13 and S15, S33 and S35—here, for example, voltage levels on data lines can be measured and forwarded to the corresponding control device 11, 21 so that they are taken into account when setting the switch connections of the switch devices 16, 26.

A second switch device of FIG. 5 has a very similar design, wherein here, however, the ISO-CAN BUS 14, 24 is held in the passive state while a data link can take place over the ETHERNET BUS via data cable 33. If the ISO-CAN BUS 14, 24 is active, the ETHERNET BUS 15, 25 is normally disconnected to maintain the transmission quality of the ISO-CAN BUS 14, 24. However, a parallel communication can be implemented both over the CAN BUS and the ETHERNET BUS via the data cable 33.

FIG. 6 shows, as part of a preferred exemplary embodiment of a method, two interconnected processes—the two strands are labeled here as I and II—on the platform of the preferred data transmission system 100 shown in FIG. 1. In a first strand I of the first process, this provides the establishment of a data connection according to ISO CAN 14, 24—in other words by means of the ISO-CAN BUS 14, 24 via the switches 16, 26, the interfaces 31, 32 and the data cable 33 as a twisted-pair cable connection between A and E, wherein for higher data volumes of 100 Mbit/s or more a second BUS connection via ETHERNET BUS is available, which is initiated at a start of a switchover operation AU and terminated with an end of a switchover operation EU.

It is important to understand that even if this method is explained in the context of an ADAS-based system, it is nevertheless also applicable to other sensor systems with higher data requirements, such as Voice-over-IP voice communication systems between towing vehicle and trailer vehicle, such as a BUS device and a BUS trailer.

The switching via intelligent switches 16, 26 is not limited to switching between a CAN BUS and an ETHERNET BUS, of course, but can also include further options for switching, for example, non-ISO 11992 specific CAN connections, both inside and outside of a vehicle or trailer.

These can be, for example, applications within the framework of the fleet management system (FMS) with an FMS interface. Transmission methods other than those described in the ETHERNET standard 802.3bp and 802.3bw can also be provided. For example, power transmissions PoDL, as specified in 802.3bu, can also be provided as additional switching information. In addition, switching states can be provided for transmission rates that exceed currently defined standards.

Returning to the procedure of FIG. 6, initially as part of a start-up sequence in a first step S1 the possibilities of an ISO-11992 communication via CAN BUS (ISO-CAN BUS) 14, 24 are tested, or the possibilities of communication via a fast ETHERNET BUS are tested.

In a first step S11 it is tested whether a possibility of a data transmission via ISO-CAN BUS 14, 24 exists (Start-up—Test ISO CAN). In addition, the live cables usually in accordance with ISO 11992 which are referenced to the supply voltage of the vehicle can be tested for their voltage level, in the context of a step S12 (Measure ISO-CAN voltage level). The query as to whether an ISO-CAN BUS is available within a predetermined period of time is implemented in a step S13 (Is an ISO CAN available in a timely manner?). If such a level is measured a positive response is given. In a YES branch Y the diagnostic data can then be read out via the ISO-CAN BUS 14, 24, the switches 16, 26, the interfaces 31, 32 and the data cable 33—for example, from the trailer vehicle to the towing vehicle—in a step S14 (Read diagnostic data from trailer). If there are no data rates with increased levels occurring, the system can remain in this state.

However, at the latest when higher data rates occur or in the event of ADAS-active data exchange becoming necessary, in a step S15 the trailer vehicle can be queried as to whether an automotive ETHERNET BUS 15, 25 is available (Is the trailer enabled for Automotive ETHERNET?).

If this query is answered negatively, within a NO branch N the communication remains on the CAN BUS 13, 23, 14, 24 in the manner described above, as shown in step S2 (Communicate on ISO CAN as long as possible—single-wire connection).

The procedure for executing a BUS-query between the trailer and towing vehicle is thereby terminated in step E.

Directly following the above step S13 or step S15, however, the system can switch over to a faster data BUS—namely here the already introduced ETHERNET BUS 15, 25 (specifically high-speed automotive ETHERNET BUS with data rates of 100 Mbit/s or more). In the following, strand II of the procedure in FIG. 6 is explained.

First of all, on the basis of the query in step S13, as part of a NO branch N the query as to whether any ISO-CAN BUS 14, 24 is available can also be answered negatively. In this case, an immediate switchover to an ETHERNET BUS 15, 25 can be carried out via switches 16, 26, as shown in step S3 or S31 (Switch over to automotive ETHERNET, Release ISO CAN). Thereafter, in a step S32 the communication between the automotive ETHERNET BUS 15, 25 can take place by switching the switches 16, 26 via the interfaces 31, 32 and the data cable 33 (twisted-pair cable) (Establish communication with automotive ETHERNET).

Overall therefore, the availability and establishment of the fast data connection can be carried out by the exchange of diagnostic messages and as soon as both data systems 10, 20 of the trailer and towing vehicle are able to communicate with each other over the fast data line, here the ETHERNET BUS 15, 25, the system switches over upon a command as part of the start of the switchover AU.

Such a switching operation can also be carried out immediately if as part of the query S12 no corresponding level relevant to a CAN BUS can be measured on the data lines within a predetermined time. Even then, as part of the step AU the system immediately switches over via S31 and S32 to the ETHERNET BUS 15, 25 via the intelligent switch 16, 26 and the fast data connection via the ETHERNET BUS is established in step S32.

However, there are also a number of cases in which an ETHERNET BUS connection is no longer necessary or no longer possible. Therefore as part of a query S33—if possible, continuously or at least periodically—a loop is executed to determine whether or not the automotive ETHERNET BUS 15, 25 is also available in a timely manner (Is automotive ETHERNET BUS available on time?). This means that after the switchover—assuming its availability—to a communication over the ETHERNET BUS 15, 25, 16, 26 it is then also tested to determine whether the timing constraints expected of the ETHERNET BUS communication are also satisfied.

This query S33 can also include a test of whether the fast data transmission for the ETHERNET BUS will be achieved in an existing or an existing stable connection. If this is not confirmed, for example within a timeout query, then following the NO branch N after step S33 the system must switch back to the ISO 11992 CAN BUS 14, 24 in step S36 (Switch back to ISO CAN, Release automotive ETHERNET BUS).

Likewise, the fast data connection for an ETHERNET BUS 15, 25 can disconnect from the BUS device as soon as an ISO-11992-compliant level is detected on a line, even if this was initially not the case at the time of the switchover operation AU. This monitoring—executed continuously if possible or at least periodically—is implemented within a YES branch Y in response to the query S33 via the steps S34 and S35; in step S34 it is queried whether ISO-CAN voltage levels are present (Automotive ETHERNET communication, continuous monitoring for ISO-CAN voltage level) and in step S35 it is queried whether the level is within the expected range (Is the level in the expected range?). Thus even if in step S33 an ETHERNET connection is available for the ETHERNET BUS of the Auto-ETHER 15, 25, in the case of an unstable connection or with an existing CAN connection, in particular if a high data transmission rate is no longer required, within a NO branch N in response to the query S33 or else in the case of confirmation of a CAN BUS within a YES branch Y in response to the query S35, the system must then switch back to the CAN BUS in step S36. This then leads back to the communication via the ISO-CAN BUS 14, 24 in step S2—here a restriction in the data rate may need to be accepted. If there is no confirmation of a CAN BUS within a NO branch N in response to the query S35, then in step S34 it is repeatedly queried whether ISO-CAN voltage levels are present.

In other words, the procedure normally ends again via communication over the ISO-CAN BUS 14, 24, and in the event that a higher data transmission rate is no longer necessary.

With this embodiment of strand II coupled with strand I of the method, it is thus ensured that, while an Auto-ETHER communication can take place via ETHERNET BUS 15, 25, if necessary, and in the event that no CAN BUS is available at all—in the former case (that an Auto-ETHER communication can take place via ETHERNET BUS 15, 25 if required) on the basis of step S15 in the YES branch Y, and in the latter case (that no CAN BUS is available at all) starting from step S13 in the NO branch N.

An Auto-ETHER communication via ETHERNET BUS 15, 25 takes place starting with AU and the step S21.

However, switching the switches 16, 26 back again is possible at any time and is normally the case, on the one hand, if the CAN BUS is confirmed as being available via step S35 and S36, or necessarily so if an ETHERNET BUS in the NO branch of step S33 does not meet the necessary stability criteria, for example if it is not available within a timeout period. This then relates to the NO branch N in response to step S33, while in the YES branch Y following step S33 the communication takes place at higher data transmission rates, but even then always under continuous monitoring of the availability of an ISO-CAN BUS 14, 24 by testing the corresponding voltage level.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 towing vehicle
2 trailer vehicle
3 driver
10, 10' first data system, data system for the towing vehicle
11 first control device, control device for towing vehicle
12 first sensor system, sensor system for the towing vehicle
12.1 ADAS-ECU for the towing vehicle
12.2 equipment for the towing vehicle
13 (first) V-CAN BUS device of the first BUS system, BUS system of the towing vehicle V-CAN
14 (first) ISO-CAN BUS device of the first BUS system, towing vehicle-based BUS system, ISO-CAN BUS
15 (second) ETHERNET BUS device of the first BUS system
16 first intelligent switch, intelligent switch for the towing vehicle 17 first connection, connection between first intelligent switch and first interface
18.1 first pairing arrow of the first intelligent switch
18.2 second pairing arrow of the first intelligent switch
19 first measuring unit
20, 20' second data system, data system for the trailer vehicle
21 second control device, control device for the trailer vehicle
22 second sensor system, sensor system for the trailer vehicle
22.1 ADAS-ECU for the trailer vehicle
22.2 equipment for the trailer vehicle
23 (first) EXT-CAN BUS device of the second BUS system, BUS system of the trailer vehicle EXT-CAN
24 (first) ISO-CAN BUS device of the second BUS system, trailer vehicle-based BUS system, ISO-CAN BUS
25 (second) ETHERNET BUS device of the second BUS system
26 second intelligent switch, intelligent switch for the trailer vehicle
27 second connection, connection between second intelligent switch and second interface
28.1 first pairing arrow of the second intelligent switch
28.2 second pairing arrow of the second intelligent switch
29 second measuring unit
30 interface connection
31 first interface
31.1 first twisted core pair of the first interface, first connector pin of the first interface
31.2 second twisted core pair of the first interface, second connector pin of the first interface
32 second interface
32.1 first twisted core pair of the second interface, first connector pin of the second interface
32.2 second twisted core pair of the second interface, second connector pin of the second interface
33 data line, physical cable connection
100 data transmission system
A start of the procedure
AU start of a switchover operation
EU end of a switchover operation
B1 first BUS system, BUS system for the towing vehicle
B2 second BUS system, BUS system for the trailer vehicle
E end of the procedure
I first strand
II second strand
J YES branch of the procedure
N NO branch of the procedure
S1-3 first to third step of the procedure
S11-15 first to fifth sub-step of the first step
S31-36 first to sixth sub-step of the third step

The invention claimed is:

1. A data system of a towing vehicle and/or trailer vehicle, the data system comprising:
a control device;
a sensor system configured to record and process sensor data;
a BUS system configured to transfer the sensor data between the control device and the sensor system, the BUS system having a first BUS device in the form of a CAN BUS and a second BUS device in the form of an ETHERNET BUS, the BUS system further having a first interface configured to establish a data connection with a second interface of a second BUS system of a second data system of a second towing vehicle and/or trailer vehicle, the first interface configured to transfer the sensor data via the data connection; and
an intelligent switch, coupled to the control device and/or to the first interface, the intelligent switch being configured to couple the first towing vehicle and/or trailer vehicle to the second towing vehicle and/or trailer vehicle in a coordinated, demand-based manner based on a security status of the data connection, a reliability status of the data connection, a data transmission rate, and a volume of data to be transmitted.

2. The data system as claimed in claim 1, wherein the intelligent switch is configured:
to enable the first BUS device in the form of the CAN BUS to connect to a CAN BUS of the second data system, and/or
to enable the second BUS device in the form of the ETHERNET BUS to connect to an ETHERNET BUS of the second data system.

3. The data transmission system as claimed in claim 1, wherein the first interface is designed:
to couple the first BUS device in the form of the CAN BUS to the second data system, and/or
to couple the second BUS device in the form of the ETHERNET BUS to the second data system.

4. The data system as claimed in claim 1, the BUS system further having a vehicle BUS of the towing vehicle and/or an expansion BUS of the trailer vehicle,
wherein the CAN BUS is an ISO-CAN BUS, and
wherein the ETHERNET BUS an automotive ETHERNET BUS, in particular an automotive towing vehicle ETHERNET BUS of the towing vehicle and/or an expansion ETHERNET BUS of the trailer vehicle.

5. The data system as claimed in claim 4, the BUS system further having, in addition to the ISO-CAN BUS, a non-ISO CAN BUS, and/or in addition to the automotive ETHERNET BUS, a power over data line (PoDL) communication connection.

6. The data system as claimed in claim 1, wherein the sensor data comprises:
multi-media sensor data of a plurality of recording devices that sense an environment of the towing vehicle and/or trailer vehicle, and/or
complex sensor data of a plurality of vehicle devices relating to the towing vehicle and/or trailer vehicle.

7. The data system as claimed in claim 1, wherein the BUS system is integrated in the towing vehicle and/or trailer vehicle as a complete system.

8. The data system as claimed in claim 1, wherein the BUS system is fitted in the towing vehicle and/or trailer vehicle as a retrofit system.

9. The data system as claimed in claim 1, wherein the intelligent switch forms the first interface.

10. The data system as claimed in claim 1, wherein the intelligent switch, independently of the first interface or as an interface switch forming the first interface, is connected to an intelligent decision logic and/or a control device of the towing vehicle and/or trailer vehicle.

11. A data transmission system, comprising:
a first data system of a towing vehicle, the first data system of the towing vehicle having:
a first control device,
a first sensor system configured to record and process first sensor data,
a first BUS system configured to transfer the sensor data between the first control device and the first sensor system, the first BUS system having a first BUS device in the form of a CAN BUS and a second BUS device in the form of an ETHERNET BUS, the first BUS system having a first interface configured to transfer the first sensor data to a second interface of a second BUS system of a second data system of the trailer vehicle, and
a first intelligent switch, coupled to the first control device and/or to the first interface;
a second data system of a trailer vehicle, the second data system of the trailer vehicle having:
a second control device,
a second sensor system configured to record and process second sensor data,
a second BUS system configured to transfer the second sensor data between the second control device and the second sensor system, the second BUS system having a third BUS device in the form of a second CAN BUS and a fourth BUS device in the form of a second ETHERNET BUS, the second BUS system further having the second interface, the second interface being configured to transfer the second sensor data to the first interface,
a second intelligent switch, coupled to the second control device and/or to the second interface; and
a data connection between the first interface of the towing vehicle and the second interface of the trailer vehicle, wherein the first and second intelligent switches are configured to couple the towing vehicle and the trailer vehicle in a coordinated, demand-based manner, and wherein the data connection is implemented as a twisted-pair cable connection.

12. The data transmission system as claimed in claim 11, wherein the first interface is switched via the first intelligent switch such that the first sensor data can be transmitted to the second BUS system of the second data system of the trailer vehicle,
via the second BUS device in the form of the ETHERNET BUS and/or via the first BUS device in the form of the CAN BUS.

13. The data transmission system as claimed in claim 11, further comprising a transmission measurement unit configured to test the data connection and to transmit a test result to a decision logic and/or the first control device for actuating the first intelligent switch.

14. A vehicle combination, comprising:
a towing vehicle;
trailer vehicle; and
the data transmission system as claimed in claim 11.

15. A method for data transmission, the method comprising:
providing a first data system of a towing vehicle, the first data system of the towing vehicle having:
a first control device,
a first sensor system configured to record and process first sensor data,
a first BUS system configured to transfer the sensor data between the first control device and the first sensor system, the first BUS system having a first BUS device in the form of a CAN BUS and a second BUS device in the form of an ETHERNET BUS, the first BUS system having a first interface configured to transfer the first sensor data to a second interface of a second BUS system of a second data system of the trailer vehicle, and a first intelligent switch, coupled to the first control device and/or to the first interface;
providing a second data system of a trailer vehicle, the second data system of the trailer vehicle having:
a second control device,
a second sensor system configured to record and process second sensor data,
a second BUS system configured to transfer the second sensor data between the second control device and the second sensor system, the second BUS system having a third BUS device in the form of a second CAN BUS and a fourth BUS device in the form of a second ETHERNET BUS, the second BUS system further having the second interface, the second interface being configured to transfer the second sensor data to the first interface,
a second intelligent switch, coupled to the second control device and/or to the second interface;
connecting the respective second BUS device in the form of the ETHERNET BUS to the trailer vehicle;
switching the first intelligent switch over to transmitting the first sensor data over the ETHERNET BUS in response to determining that a test for a possible data transmission over the ETHERNET BUS is positive; and
transmitting the first sensor data from the second BUS device to the trailer vehicle via a data connection in the form of a twisted-pair cable connection.

16. The method as claimed in claim 15, further comprising wherein transmitting the first sensor data from the second BUS device to the trailer vehicle comprises transmitting the first sensor data from the second BUS device between the first interface of the towing vehicle and the second interface of the trailer vehicle via the twisted-pair cable connection.

17. The method as claimed in claim 15, further comprising performing, by the first intelligent switch, either:
enabling the first BUS device in the form of the CAN BUS to connect to the third BUS device in the form of the second CAN BUS, or
enabling the second BUS device in the form of the ETHERNET BUS to connect to the fourth BUS device in the form of the second ETHERNET BUS.

18. The method as claimed in claim 15, further comprising connecting the first BUS device in the form of the CAN BUS and testing a possible data transmission via the CAN BUS.

19. The method as claimed in claim 15, further comprising connecting the first BUS device in the form of the CAN BUS and testing a timely data transmission via the CAN BUS;
reading diagnostic data via the CAN BUS in response to determining that the test for the timely data transmission via the CAN BUS is positive; and
switching the first intelligent switch according to a demand over to transmitting the first sensor data via the ETHERNET BUS in response to determining that a second test for possible available data transmission over the ETHERNET BUS is positive.

20. The method as claimed in claim 15, further comprising switching the intelligent switch over to transmitting sensor data via the ETHERNET BUS if a test for a timely available data transmission over the CAN BUS is negative.

21. The method as claimed in claim 15, the method further comprising switching the intelligent switch to transmitting sensor data over the CAN BUS in response to determining that a test for a timely available data transmission over the ETHERNET BUS is negative and/or if a test for a timely data transmission over the CAN BUS is positive.

* * * * *